(12) United States Patent
Elias et al.

(10) Patent No.: US 9,621,627 B2
(45) Date of Patent: Apr. 11, 2017

(54) DYNAMICALLY LAUNCHING A SERVER-BASED APPLICATION ON A MOBILE DEVICE

(71) Applicant: Interneer, Inc., Los Angeles, CA (US)

(72) Inventors: Romeo E. Elias, Los Angeles, CA (US); David Anthony Mines, Los Angeles, CA (US); Selim Ozyel, Los Angeles, CA (US)

(73) Assignee: INTERNEER, INC., Los Angeles, CA (US)

( * ) Notice: Subject to any disclaimer, the term of this patent is extended or adjusted under 35 U.S.C. 154(b) by 0 days.

(21) Appl. No.: 14/588,217

(22) Filed: Dec. 31, 2014

(65) Prior Publication Data

US 2015/0188983 A1 Jul. 2, 2015

Related U.S. Application Data

(60) Provisional application No. 61/922,757, filed on Dec. 31, 2013.

(51) Int. Cl.
| | |
|---|---|
| *H04L 29/06* | (2006.01) |
| *H04L 29/08* | (2006.01) |
| *H04M 1/725* | (2006.01) |
| *H04W 12/06* | (2009.01) |
| *H04W 12/08* | (2009.01) |

(Continued)

(52) U.S. Cl.
CPC ............ *H04L 67/025* (2013.01); *G06F 9/445* (2013.01); *H04L 63/08* (2013.01); *H04L 67/04* (2013.01); *H04L 67/34* (2013.01); *H04L 67/36* (2013.01); *H04M 1/72522* (2013.01); *H04M 1/72525* (2013.01); *H04W 12/06* (2013.01);
(Continued)

(58) Field of Classification Search
CPC .................................................. H04L 63/0428
See application file for complete search history.

(56) References Cited

U.S. PATENT DOCUMENTS

| 8,676,626 B1 * | 3/2014 | Vance ................. G06Q 10/109 705/7.16 |
| 2003/0060228 A1 * | 3/2003 | Capers .................... H04L 29/06 455/552.1 |

(Continued)

*Primary Examiner* — Hadi Armouche
*Assistant Examiner* — Ali Shayanfar
(74) *Attorney, Agent, or Firm* — Loza & Loza, LLP; Julio Loza

(57) ABSTRACT

In an aspect of the disclosure, a method and system for launching a mobile device application is disclosed including launching an application on a mobile device and transmitting a request to a remote computing device for receiving data to create a user interface for the application. The method and system further includes receiving the requested data at the mobile device and creating the user interface on the mobile device using the requested data. Also disclosed is a method of data synchronization in which data is synchronized from an application on a mobile device to an identical application on a remote computing device. The method includes establishing a communicative link between the mobile device and the remote computing device, synchronizing an application through the communicative link allowing the application to be used on the mobile device when the communicative link is discontinued and synchronizing the application upon reestablishing the communicative link.

17 Claims, 16 Drawing Sheets

Figure 1:
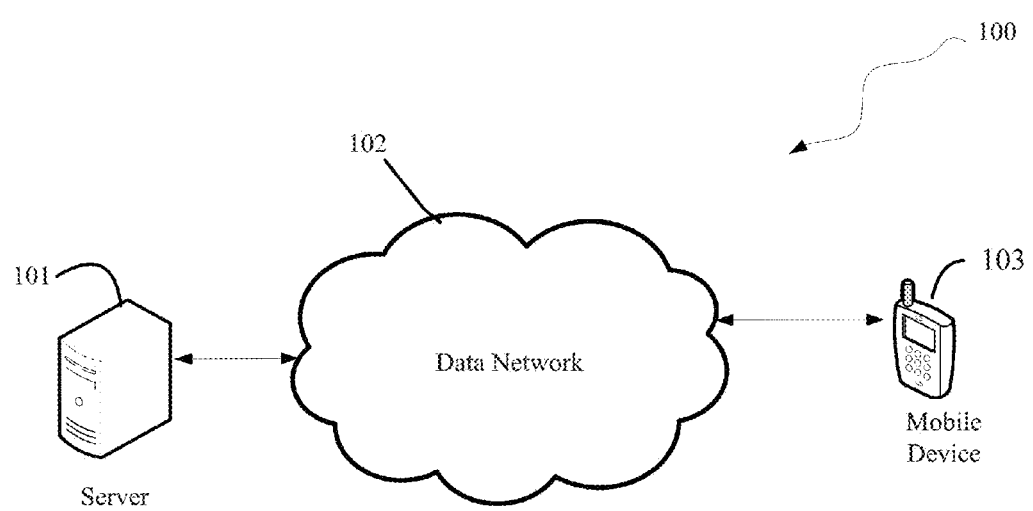

(51) Int. Cl.
  *G06F 9/445*  (2006.01)
  *G06F 9/44*   (2006.01)
  *G06F 9/455*  (2006.01)

(52) U.S. Cl.
  CPC ........... *H04W 12/08* (2013.01); *G06F 9/4443* (2013.01); *G06F 2009/45595* (2013.01)

(56) References Cited

U.S. PATENT DOCUMENTS

| | | | | |
|---|---|---|---|---|
| 2005/0119992 A1* | 6/2005 | Martino | ................ | G06F 17/243 |
| 2007/0288853 A1* | 12/2007 | Neil | ...................... | G06F 9/4448 715/760 |
| 2008/0080457 A1* | 4/2008 | Cole | ................... | H04L 12/5692 370/342 |
| 2010/0269152 A1* | 10/2010 | Pahlavan | .............. | G06F 9/4445 726/3 |
| 2011/0016025 A1* | 1/2011 | Gaisford | .............. | G06Q 10/087 705/27.1 |
| 2011/0040839 A1* | 2/2011 | Zabalan | ............... | G06Q 10/107 709/206 |
| 2012/0178431 A1* | 7/2012 | Gold | ................... | H04M 1/7253 455/420 |
| 2013/0142181 A1* | 6/2013 | Makim | ............... | H04L 12/2818 370/338 |
| 2013/0275494 A1* | 10/2013 | Gordon | ................... | H04L 67/42 709/203 |
| 2014/0089487 A1* | 3/2014 | Debate | .................. | H04L 67/025 709/223 |
| 2014/0215082 A1* | 7/2014 | Backholm | ........... | H04L 65/4084 709/227 |
| 2014/0258970 A1* | 9/2014 | Brown | ...................... | G06F 8/47 717/103 |
| 2014/0378189 A1* | 12/2014 | Lenart | ................ | H04W 52/02 455/574 |
| 2015/0055551 A1* | 2/2015 | Burckart | ............... | H04L 49/252 370/328 |
| 2015/0278388 A1* | 10/2015 | Markov | ........... | G06F 17/30905 715/744 |

* cited by examiner

DYNAMICALLY LAUNCHING A SERVER-BASED APPLICATION ON A MOBILE DEVICE

BACKGROUND

Field

Various features relate generally to mobile devices. More specifically, the invention relates to launching and rendering an application on a mobile device.

Background

Traditionally, systems have been developed to enable execution of applications on a mobile device for wireless and mobile applications. In some systems, one can execute applications on a remotely situated server, and use the mobile device as a mere output device rather than an execution environment. By so configuring, the mobile device can be adapted to handle a number of applications that may be running on a variety of application servers. For example, a browser program may be running on a first server, and an electronic mail application may be running on a second server, but the mobile device will be used as a common output device for both the applications. As a consequence, the mobile device can be treated as a thin client, with minimal need to handle complex applications locally. Accordingly, with a minimal need for additional software on the client device, any currently existing application may be accessed using this system.

In some situations, however, certain localized actions are performed on the mobile device as a result of a user action or inaction. Examples of these situations include the need to highlight a specified portion of the display area to indicate a user's selection of that portion of the display area. In such cases, there is deposited on the client device a small piece of code to handle these localized actions without the need to transmit an indication of the user's action to the server and wait for an instruction as to how the user's action should be handled. As a result, the amount of data transmitted from the mobile device to the server (and back) is somewhat reduced but still significant.

However, in the above situation the amount of data transmitted may still be too large in cases of small bandwidth or high data traffic and interaction with the server is still required. Additionally, the program execution is happening mainly on the server and not locally on the mobile device.

Therefore, there is a need to allow a program to receive data from a server in order to run the program locally on a mobile device by receiving a minimal amount of data at the mobile device that will allow users to access and execute programs with minimal delay and using minimal space on the mobile device.

SUMMARY

In an aspect of the disclosure, a method and system for launching a mobile device application is disclosed. The method and system includes at least one processing circuit launching an application launcher on a mobile device and establishing by the processing circuit and at least one communication interface a communicative link from the mobile device to at least one remote computing device, then transmitting a request through the communicative link to at least one remote computing device for receiving data through the communicative link to create a user interface for an application associated with the application launcher. The method and system further includes receiving the requested data through the communicative link at the mobile device and the processing circuit creating the user interface on the mobile device using the requested data.

In another aspect of the disclosure a method of synchronizing data from an application on a mobile device with an identical application on a remote computing device is disclosed. The method includes establishing by at least one processing circuit and at least one communication interface a communicative link from the mobile device to the remote computing device and synchronizing via the communicative link the data from the application on the mobile device with data from the identical application on the remote computing device. The method further includes discontinuing by the processing circuit and the communication interface the communicative link while continuing to update the data from the application on the mobile device and transmitting the processing circuit and the communication interface a request to reestablishing the communicative link of the mobile device with the remote computing device. Also disclose, upon reestablishing the communicative link, the data from the application on the mobile device is synchronized through the communicative link with data from the identical application on the remote computing device.

DRAWINGS

Various features, nature and advantages may become apparent from the detailed description set forth below when taken in conjunction with the drawings in which like reference characters identify correspondingly throughout.

FIG. 1 conceptually illustrates an exemplary view of a communication network that connects a mobile device to a server according to embodiments of the present invention.

Figure 2:
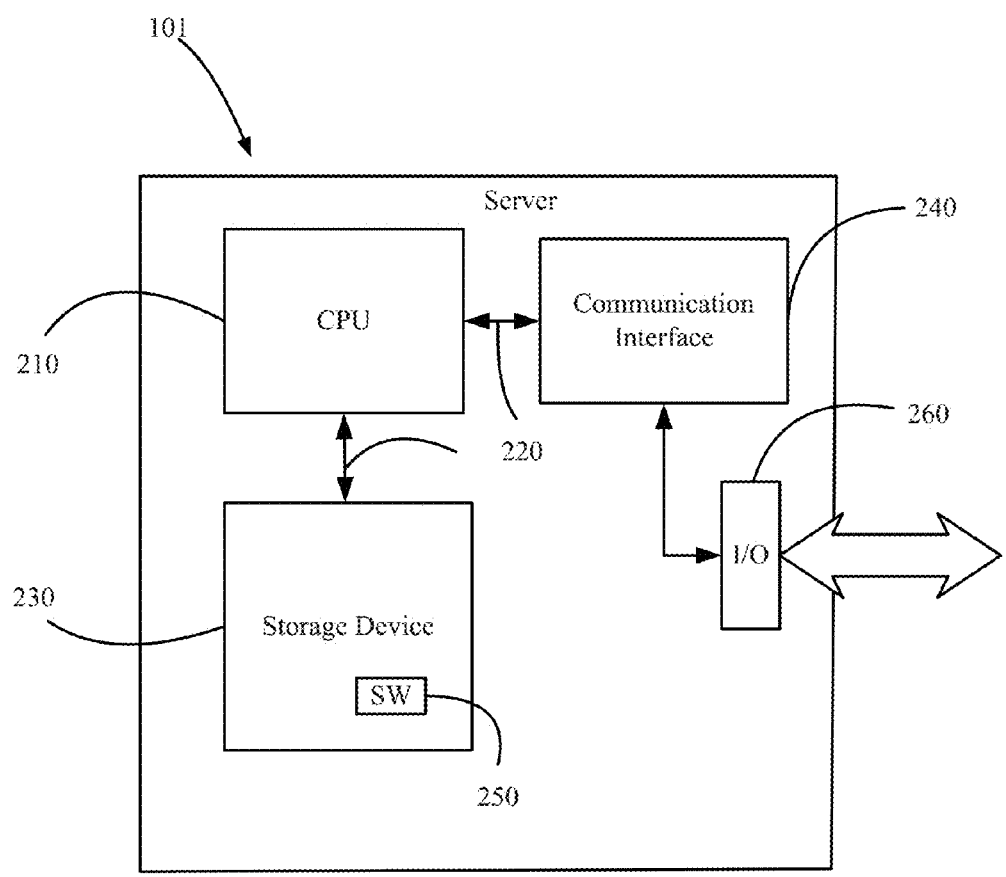

FIG. 2 conceptually illustrates a block diagram of a server according to embodiments of the present invention.

Figure 3:
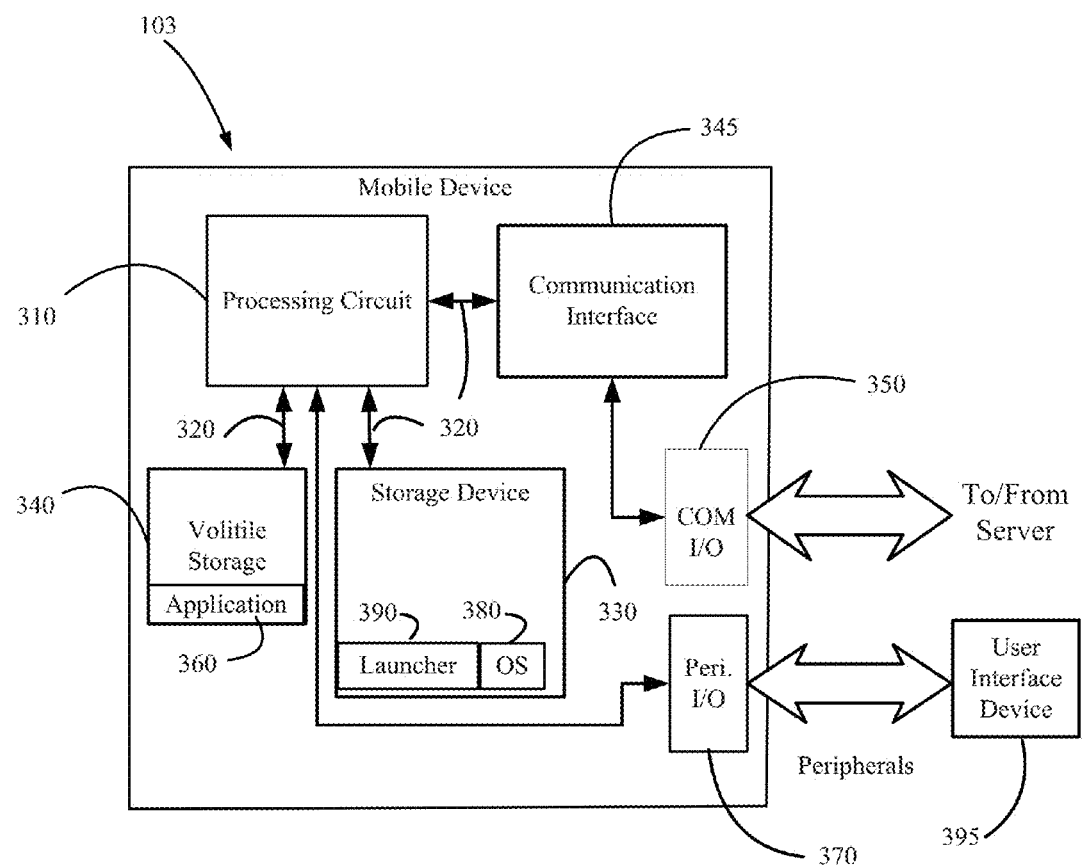

FIG. 3 conceptually illustrates a block diagram showing a mobile device according to embodiments of the present invention.

Figure 4:
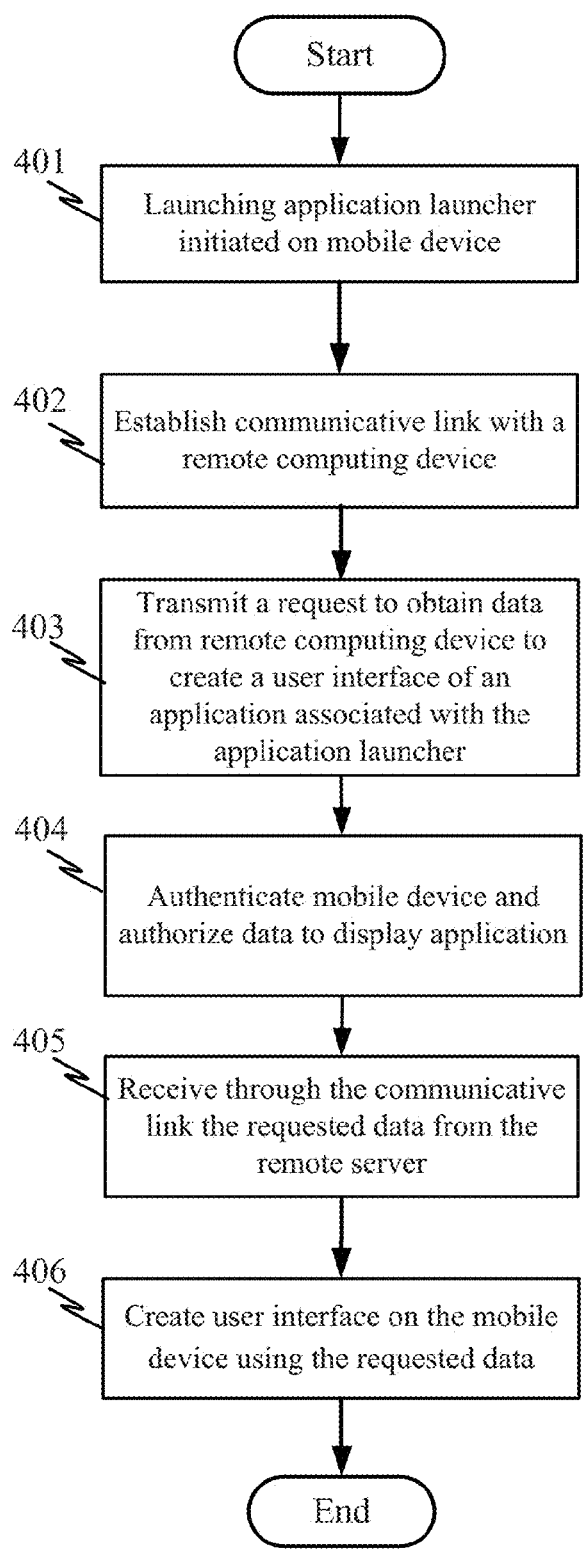

FIG. 4 conceptually illustrates a flow chart illustrating a method of launching a mobile application according to embodiments of the present invention.

Figure 5:
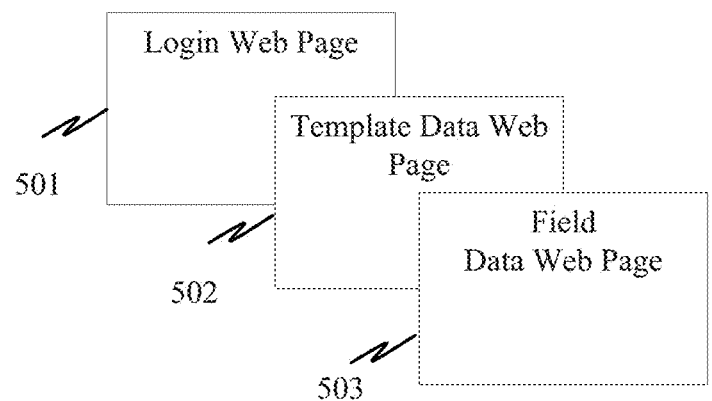

FIG. 5 conceptually illustrates example web pages on a server according to embodiments of the present invention.

Figure 6:

FIG. 6 conceptually illustrates an exemplary user interface view of a mobile application according to embodiments of the present invention.

Figure 7:
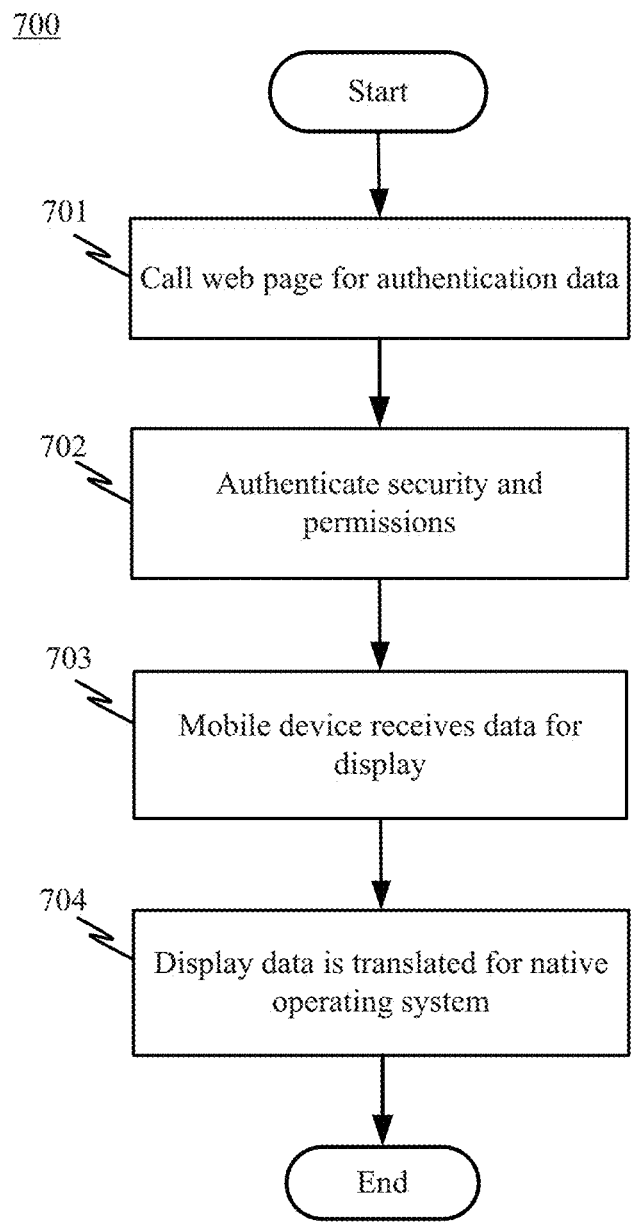

FIG. 7 conceptually illustrates a flow chart of a method of a translation of data on a server to data compatible with a native operating system of the mobile device according to embodiments of the present invention.

Figure 8:
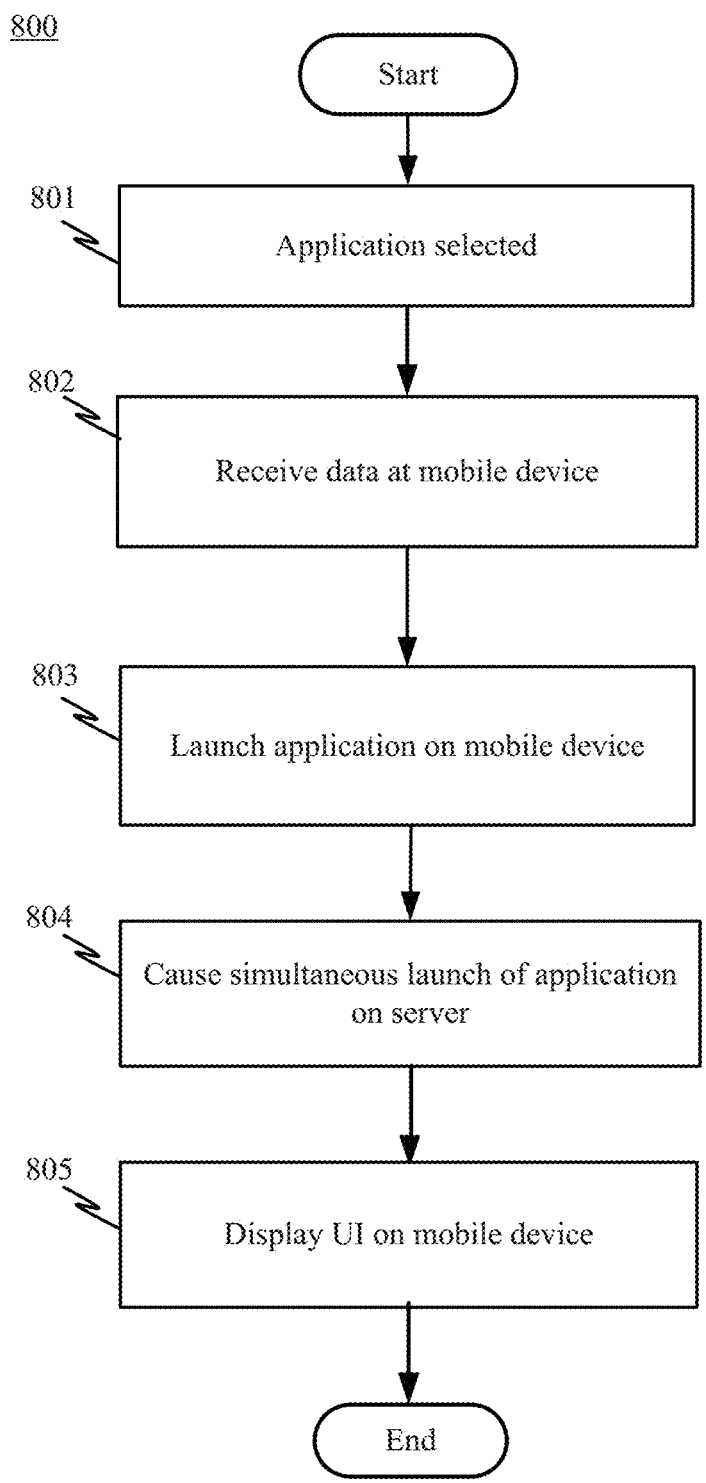

FIG. 8 conceptually illustrates a flow chart of an application operation according to embodiments of the present invention.

Figure 9:

FIG. 9 conceptually illustrates an exemplary user interface view of an application according to embodiments of the present invention.

Figure 10:
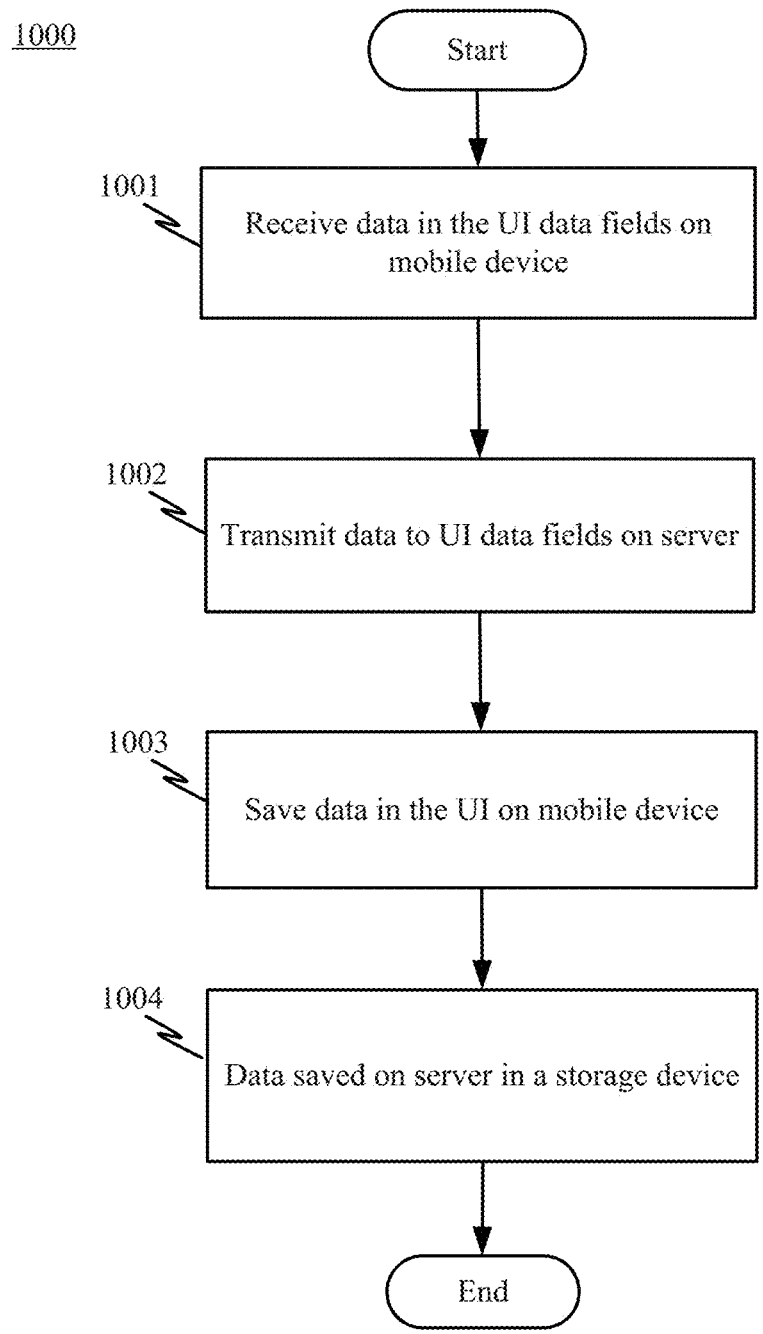

FIG. 10 conceptually illustrates a flow chart of a method of an interactive data transfer from a mobile device to a server according to embodiments of the present invention.

Figure 11:
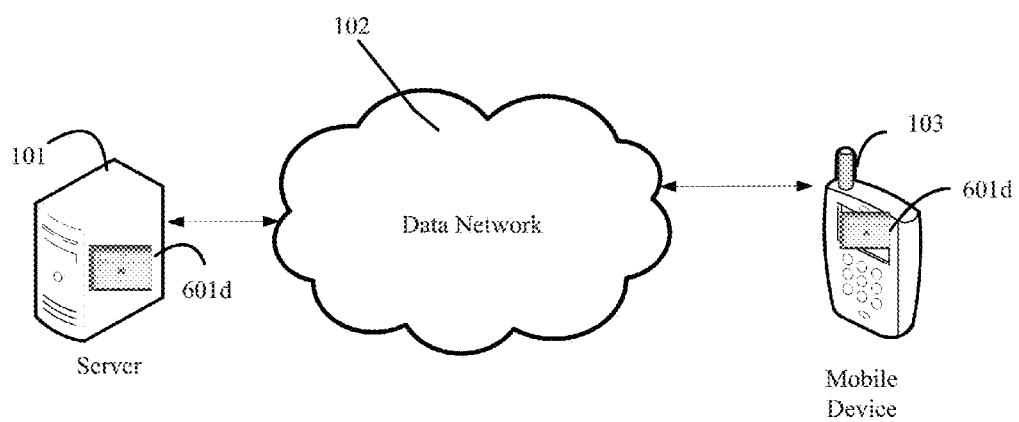

FIG. 11 conceptually illustrates a view of an application communicatively running on mobile device and server according to embodiments of the present invention.

Figure 12:
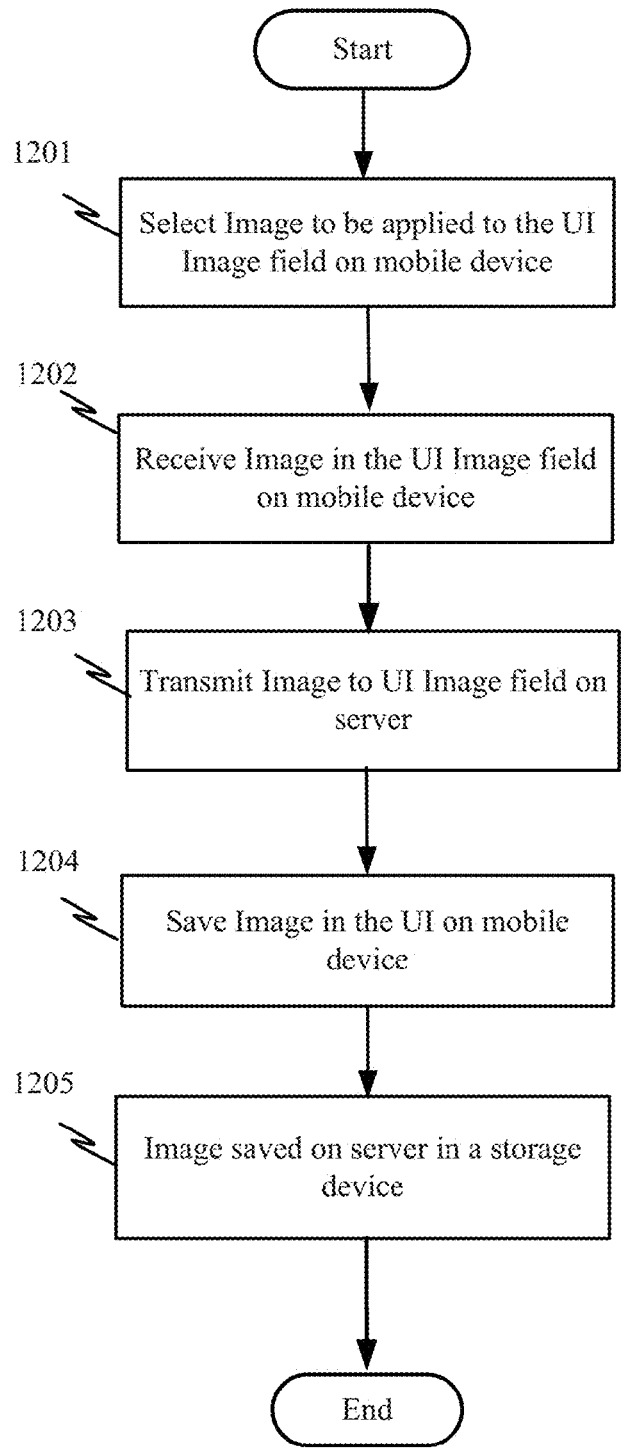

FIG. 12 conceptually illustrates a flow chart of a method of interactive data transfer of an image field from mobile device to server according to embodiments of the present invention.

Figure 13:

FIG. 13 conceptually illustrates an exemplary pie chart in an application according to embodiments of the present invention.

Figure 14:
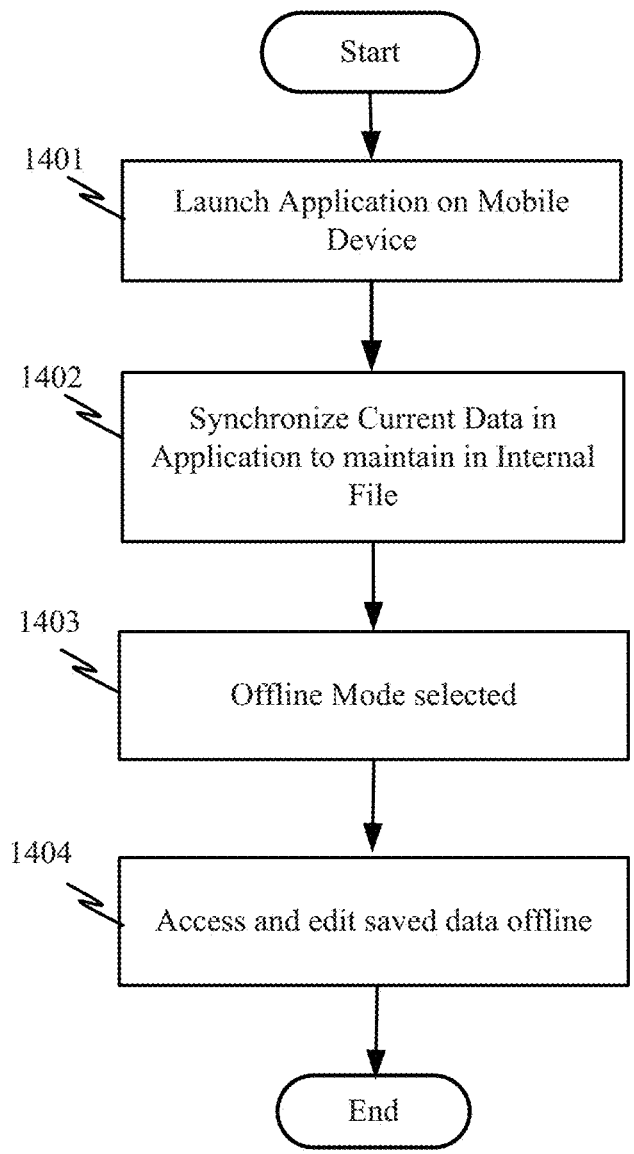

FIG. 14 conceptually illustrates an exemplary method of providing offline capabilities according to embodiments of the present invention.

Figure 15:
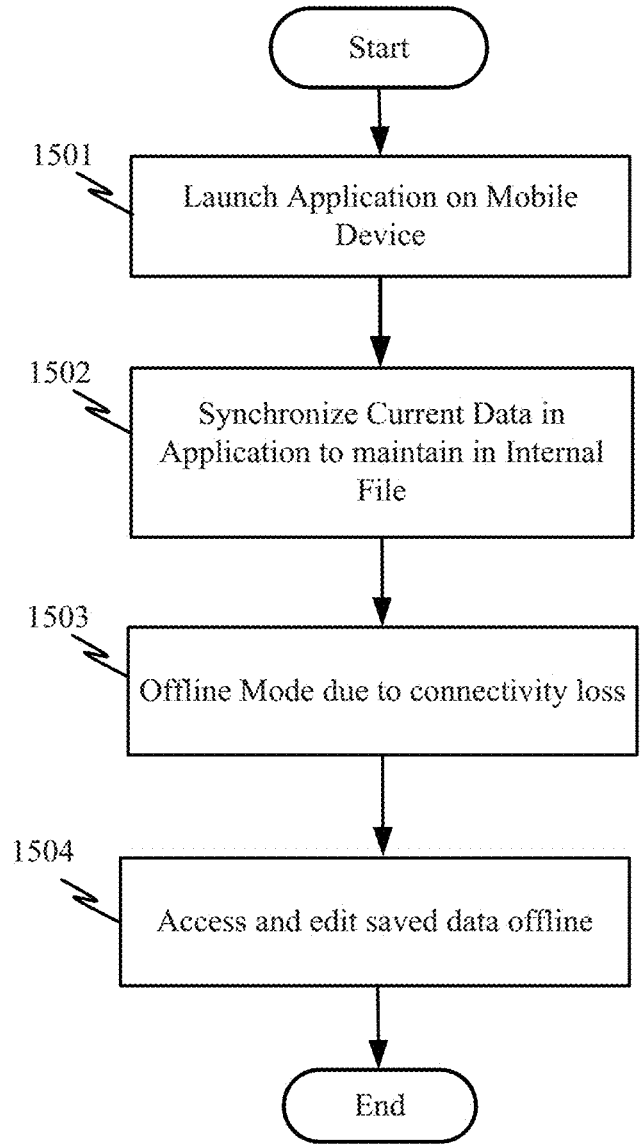

FIG. 15 conceptually illustrates an exemplary method of providing offline capabilities in the event of connectivity loss according to embodiments of the present invention.

Figure 16:
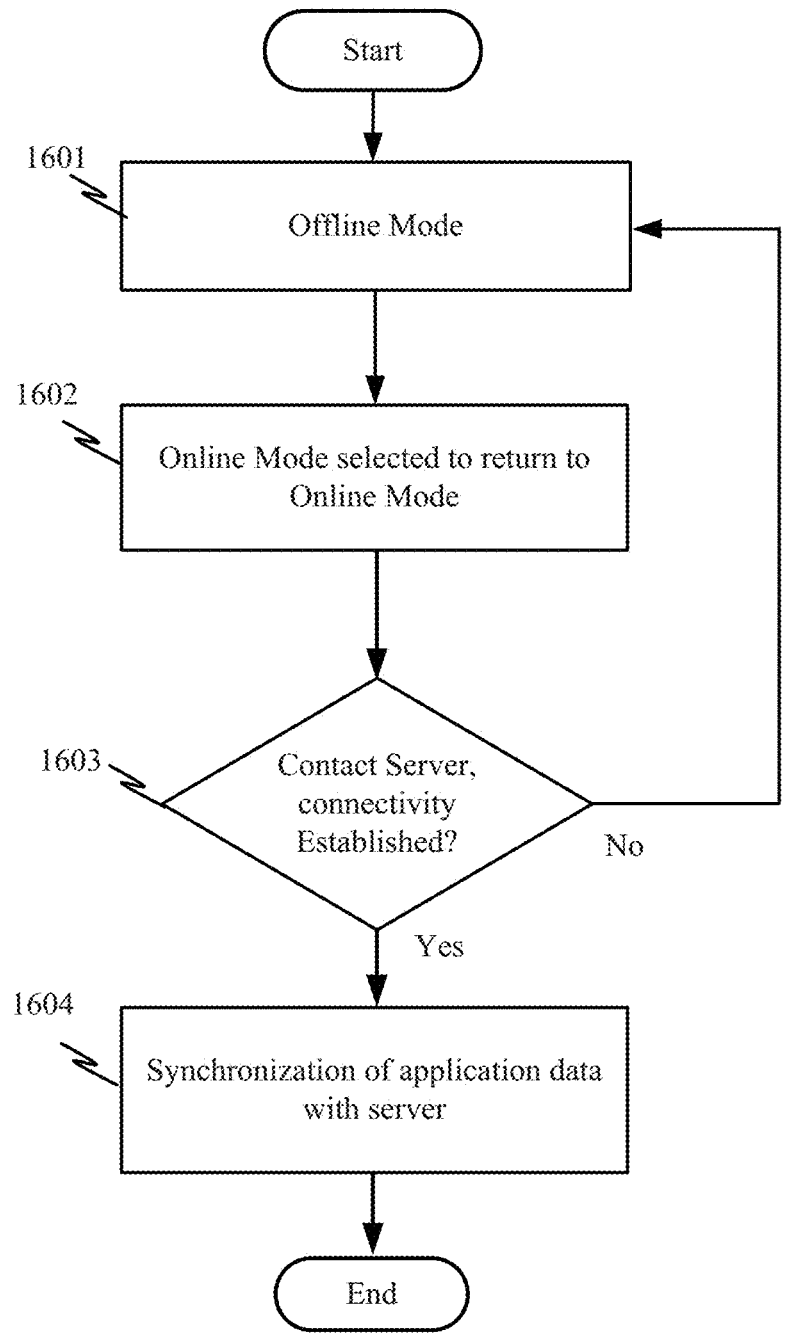

FIG. 16 conceptually illustrates an exemplary method of selecting online capabilities according to embodiments of the present invention.

DETAILED DESCRIPTION

In the following description, specific details are given to provide a thorough understanding of the embodiments. However, it will be understood by one of ordinary skill in the art that the embodiments may be practiced without these specific details. For example, operations may be shown in block diagrams, or not be shown at all, in order not to obscure the embodiments in unnecessary detail. In other instances, well-known operations, structures and techniques may not be shown in detail in order not to obscure the embodiments.

As used herein, a server may also be referred to as, and include some or all of the functionality of, a database server, a web server, an authentication server, and/or any other suitable device for providing services to a mobile device. A mobile device may also be referred to as, and include some or all the functionality of, a client device, a user equipment, a wireless or wired communication device, node, mobile terminal, a mobile station and/or any other suitable device for communicating over a network. The mobile device may be in communication with the server.

In order to facilitate the description of embodiments of the invention, the various embodiments will be described in terms of an Apple® device, such as an iPad® running Objective-C. However, the invention is not limited to Apple® devices and systems but can be performed, for example, on an Android platform running Java programming or on any other mobile platform.

Overview

Some implementations provide a device that is configured to launch an application on a mobile device. The mobile device is configured to send its authentication information to a server. The mobile device receives the application related information from a server. The mobile device receives the data that applies to the application and translates it to the native mobile device operating system platform for proper display of a user interface of the application on the mobile device. A user can view data, edit data, add instances, take pictures and save the data/pictures on the mobile device and back to the server.

The mobile device receives a minimal amount of data for constructing the user interface and allowing user interactivity with the application. The application is provided natively on the mobile device rather than being accessed by use of a remote application running on a server as is often provided in conventional applications. These improvements over the prior art enhance speed and efficiency in the operation of the application while minimizing memory usage of the mobile device.

The application on the mobile device displays a series of graphical representations on which certain actions are possible. A protocol between the mobile device and the server enables actions on the graphical representation and sending user events back to the application running on the server.

Exemplary Network Communication

FIG. 1 conceptually illustrates an exemplary network environment 100 that connects a mobile device 103 to a remote computing device such as a server 101. Specifically, FIG. 1 illustrates a server 101 in communication with a mobile device 103 through a data network 102. In some implementations, the server 101 may be a corporate server accessible by employees of the corporation in order to communicate and access business programs. In other implementations, server 101 may be a commercial server accessible by subscribers to a commercial service.

As shown in FIG. 1, data network 102 may include the internet, a subscriber wireless telephone network such as 3G, 4G or other wireless standards, or any other public or private data network that allows data communication between server 101 and mobile device 102.

As shown in FIG. 1, the mobile device 103 may be any mobile device that can access the data network in order to communicate with server 101. Mobile device 103 is in communication with server 101 through data network 102 through various connection schemes. Mobile device 103 may have a data connection to data network 102 through an Internet connection. This data connection could be a wired or wireless connection to the Internet. For example, the mobile device 103 could establish a wireless connection to the data network 102 via a wireless router (not shown). Alternatively, data network 102 may represent a cellular data network in which mobile device 103 communicates via a cellular link. The connection to the data network 102 would typically be established via a cellular transceiver in the mobile device 103. The cellular data link is used to access the Internet such as IEEE 802.11 series standards (WiFi), 3G, 4G or any appropriate network system for connection to server 101.

FIG. 1 is meant as an example communication network and not as a limiting disclosure. One skilled in the art would understand that server 101 may include many servers in communication with network 102 and in communication with each other. Additionally, mobile device 103 may include many mobile devices in communication with server(s) 101 through data network 102.

Exemplary Device Configured on Server

FIG. 2 is a block diagram showing server 101. The server 101 includes a central processing unit (CPU) 210, which can be a general purpose processor or a special purpose processor. The CPU is connected though a bus 220 to, among other things, a non-volatile storage device 230 (such as disk drives, CD-ROMs or other non-volatile storage) and a communication interface 240 that enables the server 101 to connect to a network such as data network 102. Storage device 230 may, additionally, include several storage devices, local or remote, in communication with CPU 210. In operation, CPU 210 operates software such as server software 250 adapted for establishing a communication link with mobile device 103 through an I/O port 260. Operation of server software 250 is discussed in more detail below. Exemplary transportable media implementing the server software 250 may be in any form, such as HTML.

A person skilled in the art would understand that server 101 may include more than one CPU and more than one of each connected device. Furthermore, server 101 may include other elements not shown or described in the above exemplary embodiment.

Exemplary Device Configuration on Mobile Device

The presently disclosed system includes a mobile device configured to support the embodiments herein discussed. It should be noted that a mobile device contemplated for use with the present invention may use only a graphics protocol engine rather than an execution environment FIG. 3 conceptually illustrates a block diagram showing a mobile device 103. Specifically, FIG. 3 includes a processing circuit 310. The processing circuit 310 may comprise one or more commercially available microprocessors or microcontrollers that facilitate data processing and storage. The processing circuit 310 is connected though a bus 320 to, among other things, a non-volatile storage device 330, a temporary storage device 340, a communication interface 345, a communication I/O port 350, and a peripheral I/O port 370. Communication interface 345 enables the mobile device 103 to connect to a network such as data network 102 through communication I/O port 350. The non-volatile storage device 330 comprises at least one of Read Only Memory (ROM), flash memory or any other form of digital storage that is preferably of non-volatile nature. The temporary storage device 340 comprises at least one of, Random Access Memory (RAM), disk drive storage, optical storage, flash memory or any other form of digital storage, local or remote, and is preferably of temporary nature. Processing circuit 310 operates software such as a mobile application launcher 390 adapted for establishing a communication link with server device 101 through communication interface 345 and I/O ports 350 upon the launching of a mobile application 360. Storage device 330 includes an operating system (OS) 380 that is accessed by processing circuit 310 for control functions of mobile device 103 including peripheral units through I/O port 370. The operating system may be, for instance, iOS, Android, Windows 8 or any other compatible operating system. Launcher 390 may include login information for application on mobile device 103 including. Peripheral units connected through I/O port 370 include display 395. Display 395 may be a touch screen allowing inputs to processing circuit 310 through I/O port 370.

A person skilled in the art would understand that mobile device 103 may include more than one processing circuit and more than one of each of the connected devices. Furthermore, mobile device 103 may include additional peripherals and elements not shown or described in the above exemplary embodiment.

Exemplary Launcher Operation

Generally, a launcher or launcher application refers to a program or instructions operating on a mobile device that is specifically configured to communicate with a server from which data is obtained for one or more user interfaces associated with one or more applications.

FIG. 4 is a flow chart illustrating a method 400 of launching an application according to embodiments of the present invention. The method begins and proceeds to step 401 where a request to launch application 360 is initiated on mobile device 103. The request may be in the form of a launcher icon associated with launcher 390 on a display device which may be selected by a user and communicates the request to processing circuit 310 through peripheral I/O 370 for execution of launcher 390 on storage device 330.

At step 402, launcher 390 executes login software included in launcher 390 via processing circuit 310. The login software first causes processing circuit 310 to establish a communicative link with server 101. The communicative link is established from control commands from OS 380 executed by processing circuit 310 and communicated through communication interface 345 and I/O 350. The communication link is connected through data network 102 in communication with server 101 at I/O 260 and communication device 240.

At step 403, launcher 390 requests login information for logging in and using application 360. The login request calls a login web page 501 (see FIG. 5) on server 101. Login page 501 contains, for example, the login authentication information. Additional data may be contained on other web pages.

FIG. 5 conceptually illustrates an example of some web pages on server 101 that may be called by launcher 390 and application 360 according to embodiments of the present invention. The web pages include login web page 501, template data web page 502 and field data web page 503 for example.

At step 404, the login request causes server 101 to authenticate the mobile device 103 and authorize the data required to display application 360. Mobile device 103 receives authorization from server 101 which includes authorizing the user interface (UI) data, applications available on application 360 and the available data fields on application 360 which may then be executed and processed by processing circuit 310. As will be discussed further, access to application 360 is not limited to one user. Any user with proper authorization may access application 360.

At step 405, mobile device 103 receives the data from server 101 through the communicative link established in step 402. The data includes the UI and a list of all individual applications available to application 360 per the authentication provided by the login information. The data may be received by launcher 390 on mobile device 103 in an XML format. The XML data is then translated by launcher 390 to the native operating system of mobile device 103. The data in XML format is a minimal amount that is sufficient to provide graphical representation on the mobile device 103. The UI of application 360 is assembled from the XML data received from server 101. The translation of data is further discussed below with reference to FIG. 7.

In an exemplary embodiment in which the mobile device 103 is an iPad running iOS and the XML data is thus translated to be readable in an Objective-C format. Objective-C is an Apple® platform running on an Apple® iPad®. Objective-C receives data to implement launcher 360. The iPad® receives the XML data and determines views the iPad® will display based on that XML data.

At step 406, the UI for launcher 360 is stored in temporary storage 340 and displayed on mobile device 103 through I/O 370 to the display 395. The application is thus operational natively on mobile device 103.

FIG. 6 conceptually illustrates an example UI 601 of application 360. UI 601 displays individual applications or Apps 601*a*-601*f* as the available applications associated with application 360. The applications shown are meant only as examples and not meant to be a limiting embodiment of the present invention.

Exemplary Translation Operation

FIG. 7 conceptually illustrates a method 700 of a translation of the XML data to data compatible with the native operating system 380 of mobile device 103 in order to construct the graphical representation of the UI on the mobile device 103.

The method begins and proceeds to step 701 where processing circuit 310 executes launcher 390 to communicate through the communicative link established in step 402 of method 400 above and calling a web page 501 on server 101 for the authentication information.

At step 702, the security, permitted applications, workflow and data fields are authenticated on server 101 as discussed with regards to method 400 above.

At step 703, the mobile device 103 receives XML template data for applications 601 from web page 502 and field data web page 503 through the communicative link. The data includes labels, fields and all display information. The data received by the discussed method minimizes the amount of data transferred to enable the application saving both the amount of memory space required and time to receive the data at the mobile device 103.

At step 704, launcher 390 processed via processing circuit 310 translates the XML data to data compatible with the native operating system 380. The native operating system may be, for instance, iOS, Android, Windows 8 or any other operating system compatible with a mobile device. In the present example, the operating system 380 is iOS running Objective-C to construct the graphical representation of the UI of application 360.

Exemplary Application Launch Operation

FIG. 8 is a flow chart illustrating a method 800 of an application operation according to embodiments of the present invention. The method begins and proceeds to step 801 where one of the Apps 601a-601f of application 360 is selected on mobile device 103 through I/O 370 to the display 395. For example, App 601d may be selected and will be used here to illustrate embodiments of the invention.

At step 802, the selection of App 601d causes XML data to be received by mobile device 103 from server 101 through the communicative link established by selection of launcher 390 through communication interface 345 and I/O 350. As discussed above the XML data received is translated for the native operating system which, in continuing the example above, is iOS operating on an iPad. The XML data received is sufficient to allow the Objective-C program to construct the UI for App 601d. However, no Objective-C data is received from server 101.

At step 803, App 601d is launched and resident on mobile device 103 in temporary storage 340. Launcher 390 processed by processing circuit 310 parses the XML data for a graphical representation of the App 601d. In this example, the graphical representation is in the Objective-C format which creates the UI components including, tabs, navigation bar, side bar and the like. Additionally, objects are created such text, date, numbers, selection lists and the like.

At step 804, launching App 601d causes a simultaneous launch of the same App 601d on server 101 contained in server software 260 through the communicative link established by launcher 390 through communication interface 345 and I/O 350 with server 101 which establishes the communicative link through communication interface 240 and I/O port 260. Server software 260 additionally includes all the applications available to application 360 on mobile device 103. The server software 260 and the included Apps on the server 101 may be in an HTML format, for example, or other formats but not necessarily the same as that on mobile device 103. The App 601d will be launched with the appropriate form and access in accordance with the authentication information received as discussed with regards to method 400.

At step 804, the UI of App 601d is now displayed on display 395 and is communicatively linked to server software 260 on server 101 through communication interface 345 and I/O 350 with server 101 through I/O port 260 and communication interface 240.

FIG. 9 conceptually illustrates an exemplary view of the UI of App 601d of an embodiment implemented in Objective-C programming language. The UI of App 601d provides a wide range of capabilities including text fields, numbers, drop downs, files, images, approve/reject buttons, macro buttons, new entry buttons, categories, tables, reports, pie charts, bar charts and line charts.

Exemplary Application Operation

The application on the mobile device 103 displays a series of graphical representations on which certain actions are possible. The protocol between the mobile device 103 and the server 101 enabled by the communicative link established by launcher 390 enables actions on the graphical representation and sending user events back to the application running on the server 101.

FIG. 10 conceptually illustrates a flow chart of a method 1000 of interactive data transfer from mobile device 103 to server 101. Server 101 communicating through communication interface 240 provides interactive access of server software 260 through application 360 on mobile device 103 through communication interface 345. As method 1000 begins, App 601d of application 360 is running on server 101 and mobile device 103. In this exemplary embodiment, App 601d is running in HTML format on server 101 and in Objective-C on mobile device 103.

The method begins and proceeds to step 1001 where the data is received into App 601d into data fields 901 on mobile device 103 through the communicative link. The data is received into the data fields 901 through I/O port 370 to be displayed on the touch screen of display 395, for example.

At step 1002, the mobile device 103 is communicatively linked to server 101 as described step 402 of FIG. 4 above and transmits the data fields 901 to server 101 through the communicative link, thus updating App 601d on server 101. The data fields are transmitted in XML format, for example.

At step 1003, the data in data fields 801 are saved by the processing circuit 310 into temporary storage device 340 on mobile device 103.

At step 1004, saving the data in data fields 901 on mobile device 103 causes the data fields 901 to be saved on server 101 via the communicative link. Server 101 stores the data via CPU 210 in storage device 230, thus maintaining App 601d in a non-volatile storage medium. The data may be stored in a database, such as an SQL database, on storage device 230, for example.

On the mobile device 103, App 601d resides in temporary storage device 340. Subsequently, App 601d is stored on server 101 on storage device 230 complete with data fields 901 as entered and stored in step 1002. Therefore, when App 601d is launched again on mobile device 103 as in method 800, the UI and the completed data fields 901 will be reconstructed and displayed on mobile device 103 as in the immediate prior session. Furthermore, any properly authenticated user as described in step 404 of FIG. 4 may access App 601d as stored on server 101.

FIG. 11 conceptually illustrates a view of App 601d communicatively running on mobile device 103 and server 101. App 601*d* is running in Objective-C via processing circuit 310, for example, on mobile device 103 and is communicatively linked to server 101 through data network 102, the communicative link established as described in step 401 of FIG. 4. Server 101 is running App 601*d* in HTML format, for example. Data received through peripheral inputs through I/O port 370 can be applied to App 601*d* on mobile device 103. The data is simultaneously transmitted to App 601*d* on server 101 through the communicative link. Therefore, the UI and data fields of App 601*d* are synchronized on the mobile device 103 and server 101.

Exemplary Application Operation Including an Image Field

FIG. 12 conceptually illustrates a method 1200 of interactive data transfer of an image field from mobile device 103 to server 101. As in the method 1000 above, server 101 provides interactive access of server software 260 through application 360 and the communicative link established by launcher 390 through communication interface 345 and I/O 350 on mobile device 103 to server 101 through I/O port 260 and communication interface 240. As method 1200 begins, reference is again to App 601*d* which is running on server 101 and mobile device 103.

The method begins and proceeds to step 1201 where an image field 902 is available on App 601*d*. A photo may be selected and applied to App 601*d* in image field 902 through processing circuit 310. The photo may be selected by a drop down menu or through an image capture device such as a camera on mobile device 103 communicating through I/O 370, for example.

At step 1202, the photo image is received into App 601*d* into image field 802.

At step 1203, the mobile device 103 is communicatively linked to server 101 as described above and transmits the image data field 902 to server 101 through the communicative link, thus updating App 601*d* on server 101. The image may be transferred by a web post or HTTP post to transmit the image to server 101.

At step 1204, the image data in image field 902 is saved on mobile device 103.

At step 1205, saving the image data in image field 902 on mobile device 103 causes the image field 902 to be saved on server 101 via the communication link. Server 101 stores the image in storage device 230, thus maintaining App 601*d* in a non-volatile storage medium. When the App 601*d* closed on mobile device 103 and launched again on mobile device 103 as in method 800, the UI and the completed image field 902 will be reconstructed and displayed on mobile device 103 as previously completed.

Other Exemplary Application Utilizing Mobile Device Functions

In the above exemplary embodiment, it is noted that App 601*d* accessed the image capture device available on the mobile device 103. In similar fashion, application 360 and the library of individual applications available on application 360 (Apps 601*a*-601*f*, for example) are configured to access various functions available on the mobile device 103. For example, application 360 and the individual applications may access GPS features on the mobile device 103 to provide location information and the like that may be required by the application 360 and the individual applications. Other features that may be accessed include, but are not limited to, audio and video functions, communication functions, contact lists and various other functions and features of the mobile device 103.

Other Exemplary Application Operation

FIG. 13 conceptually illustrates an exemplary pie chart 1301 of an embodiment of a UI of an application on mobile device 103. The application is implemented by processing circuit 310 in Objective-C programming language. In accordance with the method discussed with regard to method 700, App 601*f* is selected on mobile device 103 providing the UI of a report as shown in FIG. 13 on display 395. A user may input data related to the chart which is then received as in step 1001. The data is applied to App 601*f* and produce the pie chart shown in FIG. 13. The App 601*f* may be saved on mobile device 103 and according to methods of the present invention saved on server 101 on storage device 230 and is accessible by other authorized users.

In other embodiments each of the data fields, tabs and layout of the UI may be potentially changed by a user on mobile device 103. As a result of the communicative link to the server 101 the changes are implemented simultaneously and saved on server 101 for reconstruction on mobile device 103.

In other embodiments, the application 360 may be edited or otherwise modified on server 101 by authorized users of application 360. The application is then saved on server 101 in an HTML format, for example. Mobile device 103 will receive the data for the application when the application is launched on mobile device 103 as saved on server 101 with the modifications.

Exemplary Application Operation in Offline Modalities

Application 360 includes offline capabilities. FIG. 14 conceptually illustrates an exemplary method 1400 of providing offline capabilities of application 360.

The method begins and proceeds to step 1401 where the application 360 is launched from launcher 390 on mobile device 103.

At step 1402, a data synchronization may be selected to synchronize the current data in application 360 to maintain the current Apps 601*a*-601*f* in storage device 340 on mobile device 103 with Apps 601*a*-601*f* stored in storage device 230 on server 101. The selection of the data synchronization causes processing circuit 310 to update the internal files related to Apps 601*a*-601*f* of mobile device 103 with each data read received from server 101 through the communicative link established by launcher 390 executed by processing circuit 310 and through communication interface 345 and I/O 350 on mobile device 103 to server 101 through I/O port 260 and communication interface 240. Conversely, the data synchronization selection will cause processing circuit 310 to send via the communicative link the internal files related to Apps 601*a*-601*f* of mobile device 103 that have been changed local to mobile device 103. The data synchronization will synchronize all data between server 101 and application 360 on mobile device 103 via the communicative link.

At step 1403, an offline mode may be selected from the main menu of application 360 or in the main menu of each of Apps 601*a*-601*f*, for example. For example selecting the an offline mode may be executed by selecting a Go Offline button, for example in the main menu of application 360 or in the main menu of each of Apps 601*a*-601*f* which communicates the selection from display 395 through I/O port 370 to processing circuit 310 which commands communication interface 345 to discontinue the communication link with server 101. Once selected, application 360 is no longer in communication with server 101 and any data changes on application 360 are not uploaded to server 101 until a communicative link with server 101 is reestablished through the resumption of online mode and data synchronization as discussed below. In the offline mode the individual Apps 601a-601f will be available for viewing and updating per the authorization permissions of the user and any data change to Apps 601a-601f are saved locally on mobile device 103 in temporary storage device 340, for example. All data in Apps 601a-601f that are current as of the last online connection with session can be viewed or edited. Apps 601a-601f that had not been accessed, viewed or edited during a previous online session will not be available for viewing or editing in the offline mode. Only those applications that have been accessed and permissions and authorizations been verified will be available in the offline mode.

The offline mode may be selected by selecting, for example, a Go Offline button on the main menu of application 360, for example. In addition, each individual application Apps 601a-601f may, for example, similarly include an offline mode selection capability on the main menu of Apps 601a-601f. Each user interface of application 360 and the individual Apps 601a-601f may further include an online/offline indicator to a user on mobile device 103 through display 345 indicating whether the application 360 is in online or offline mode. The online/offline indicator may include a message or may, for example, display a yellow bar warning the user that application 360 is offline.

At step 1404, the saved draft of step 1402 may, for example, remain in storage device 340 and Apps 601a-601f may be accessed and edited on mobile device 103 until the online mode is reestablished. An operation of a next step in a workflow of Apps 601a-601f may also be saved to storage device 340. The steps of an advance of a workflow or running of a macro, for example, will be saved to storage device 340, however, the steps to advance the workflow or run the macro will not occur until the next sync operation when the application 360 returns to online mode.

FIG. 15 conceptually illustrates an exemplary method 1500 of providing offline capabilities of application 360 in the event of connectivity loss of application 360 with server 101.

The method begins and proceeds to step 1501 where the application 360 is in online mode on mobile device 103 and the communicative link is established as describe in step 1402 of FIG. 14.

At step 1502, a data synchronization may be selected to synchronize the current data in application 360 to maintain the current Apps 601a-601f in memory on mobile device 103 on storage device 340, for example. The selection of the data synchronization causes processing circuit 310 to update the internal files related to Apps 601a-601f of mobile device 103 with each data read received from server 101 through the communicative link established by launcher 390 through communication interface 345 and I/O 350 on mobile device 103 to server 101 through I/O port 260 and communication interface 240. Conversely, the data synchronization selection will cause processing circuit 310 to send via the communicative link the internal files related to Apps 601a-601f of mobile device 103 that have been changed local to mobile device 103. The data synchronization will synchronize all application data between server 101 and application 360 on mobile device 103. The internal file of mobile device 103 and server 101 are updated with the current saved data.

In addition, Apps 601a-601f may include a Sync option in the application drop down menu that, when selected, will automatically synchronize Apps 601a-601f with the corresponding Apps 601a-601f on server 101. Thus, even without selecting the data synchronization option, the internal file related to Apps 601a-601f of mobile device 103 and server 101 are updated with the current data.

At step 1503, offline mode may be initiated when application 360 cannot connect to the server 101. This exemplary embodiment may be caused by loss of connectivity of mobile device 103; the server 101 may be temporarily unavailable or other interruptions connectivity of application 360 with server 101. The data in application 360 may be available to the user as of the last synchronization (automatic or selected) prior to going offline.

In the offline mode the individual Apps 601a-601f will be available for viewing and updating per the authorization permissions of the user. All data in Apps 601a-601f are current as of the last online connection with session can be viewed or edited. Apps 601a-601f that had not been accessed, viewed or edited during a previous online session will not be available for viewing or editing in the offline mode. Only those applications that have been accessed and permissions and authorizations been verified will be available in the offline mode.

Each user interface of application 360 and the individual Apps 601a-601f further include an online/offline indicator to a user on mobile device 103 indicating whether the application 360 is in online or offline mode. The online/offline indicator may include a message or may, for example, display a yellow bar warning the user that application 360 is offline.

At step 1504, the saved draft of step 1502 may, for example, remain in storage device 340 until the online mode is reestablished. An operation of a next step in a workflow of Apps 601a-601f may also be saved, however, the advance of the workflow or running of macros may not occur until the next Sync operation when the application 360 returns to online mode.

FIG. 16 conceptually illustrates an exemplary method 1600 of selecting online mode capabilities of application 360.

At step 1601, application 360 is in offline mode as in the examples described above with respect to FIG. 14 and FIG. 15 above.

At step 1602, the online mode may be selected, for example, from a Go Online and Sync radio button in the main menu of application 360 causing application 360 to attempt to contact the server 101. The Go Online and Sync option causes processing circuit 310 to establish a communicative link with server 101. The communicative link is established from control commands from OS 380 through communication interface 345 and I/O 350. The communicative link is connected through data network 102 in communication with server 101 at I/O 260 and communication device 240. The online mode may also be selected, for example, by a Go Online and Sync option in a main menu of any Apps 601a-601f. Online mode is not automatically reestablished as a result of the connection being resumed but must be selected, for example, form the Go Online and Sync option.

At step 1603, mobile device 103 attempts to contact server 101 via the communicative link, if the contact is successful, the process moves to step 1604 where all data changed on application 360 while in offline mode will be synchronized to the server 101 as described in step 1502 of FIG. 15 above.

At step 1604, a synchronization of Apps 601*a*-601*f* will automatically be performed if the Sync option had been selected in Apps 601*a*-601*f*. Any offline insertion and changes to Apps 601*a*-601*f* since the last synchronization with server 101 will be synchronized with server 101. Additionally, at step 1604 any delayed actions such as save; the next step in a workflow; or the running of a macro will, at step 1604, continue in the online mode when the synchronization occurs. Moreover, any updated data for Apps 601*a*-601*f* that were made on server 101 while application 360 was offline will be applied to Apps 601*a*-601*f* during the synchronization with server 101 at step 1604.

If at step 1603, the contact is unsuccessful, the processing circuit causes application 360 on mobile device 103 to return back to offline mode at step 1601 and an indicator displayed on display 345, for example, will warn the user that the application 360 remains offline and the Go Online and Sync option of step 1602 must again be selected for additional attempts to return to online mode.

In a further embodiment, all tables and categories that may be available on application 360 may include a sync data check box in the properties of the tables and categories. In the event that application 360 goes from offline to online mode, server 101 selects the tables and categories that have the sync data check box selected and data is transferred to application 360 on mobile device 103. The internal files of the mobile device are updated with the data.

In another embodiment, the phone on mobile device 103 when in use may prevent contact with the server 101 when a login, data acquisition or data save is requested. In this exemplary embodiment, application 360 automatically switches to offline mode as in step 1403. The online/offline indicator will indicate to the user that the application 360 is in offline mode.

In another embodiment, the Apps 601*a*-601*f* may further include the option of clear offline cache to clear the storage device 340 of mobile device 103

According to some aspects and features described herein, an application may be launched at a mobile device via a launcher application that communicates with a server which provides data and/or formatting for presenting the data on the mobile device. The launcher may translate formatting to a native, device-specific format (e.g., based on the mobile device operating system, display capabilities, etc.). Such launcher may serve to launch (e.g., load and present data and formatting) a plurality of different applications on a mobile device, thereby avoiding the need to validate or test each application with each mobile device. Instead, the server may provide application data to many different types of mobile devices and the launcher on the mobile device(s) manage formatting of the data.

According to other aspects and features described herein, data is centrally managed at the server. The mobile device may have wired/wireless connectivity to the server (e.g., via a network). This permits a user of a mobile device to add and/or modify data, and such data is updated and stored at the server. This also allows other users on mobile devices to also access this data as it is modified. Note that the other users on mobile devices may be using the same application or different applications that also access the same data on the server.

At the server, templates may be used to build applications. Such templates, for example, may define data and/or datasets accessible within a database. A combination of templates and/or fields may serve to define an application. Construction of such application may be done in a graphical manner by selecting and linking templates/objects. An application builder interface permits building applications with the need for conventional programming Such application builder takes care of backend processes for implementing the applications.

According to yet other aspects and features described herein, the mobile device may include a caching feature that stores data changes on the mobile device if the mobile device loses connectivity with the server. Once the mobile device restores connectivity to the server, the mobile device may send the changed data to update the server.

Additionally, the server may link to other external databases from the templates and/or transparently provide such data to the mobile devices via the applications. Consequently, applications are not limited to datasets available on the server, but can transparently link to other databases.

It should be emphasized that embodiments of the methods described herein are performed locally on the mobile device in a native operating system for the mobile device. The server sends and receives data to application(s) on the mobile device, but the application is not executed on the server.

The word "exemplary" is used herein to mean "serving as an example, instance, or illustration." Any implementation or aspect described herein as "exemplary" is not necessarily to be construed as preferred or advantageous over other aspects of the disclosure.

In the present disclosure, numerous elements of a system are listed as possible elements that can be used to operation of the system and its components. However, it should be noted that these elements are merely examples and that other elements may be used as well.

The various features of the invention described herein can be implemented in different systems without departing from the invention. It should be noted that the foregoing aspects of the disclosure are merely examples and are not to be construed as limiting the invention. The description of the aspects of the present disclosure is intended to be illustrative, and not to limit the scope of the claims. As such, the present teachings can be readily applied to other types of apparatuses and many alternatives, modifications, and variations will be apparent to those skilled in the art.

What is claimed is:

1. A method of launching an application on a mobile device comprising:

launching, by a processing circuit in the mobile device, an application launcher on a mobile device;

establishing, by the processing circuit and a communication interface of the mobile device, a communicative link from the mobile device to a remote computing device;

transmitting, through the communicative link, a request to the remote computing device for obtaining data to assemble a user interface of an application associated with the application launcher;

receiving, at the mobile device through the communicative link, the requested data from the remote computing device; and assembling the user interface of the application using the requested data, the application residing on the mobile device, and the requested data is sufficient to assemble the user interface, wherein the application residing on the mobile device continues operating on the mobile device when the communicative link to the remote computing device is disconnected and, upon reestablishment of the communicative link, data is synchronized from the application on the mobile device to the remote computing device.

2. The method of claim 1, wherein the received data is received from the remote computing device in a first format type and is translated by the application launcher on the mobile device from the first format type into a second format type, and wherein the second format type is compatible with an operating system of the mobile device.

3. The method of claim 2, wherein the one remote computing device and the mobile device are communicatively linked.

4. The method of claim 1, wherein a change in the one application on the mobile device causes a change in the remote computing device.

5. The method of claim 1, wherein transmitting the request to the remote computing device further comprises causing the remote computing device to authenticate the mobile device.

6. The method of claim 5, wherein authenticating the mobile device comprises:

receiving authorization permission through the communicative link to access the application; and receiving authorization permission through the communicative link to modify at least one data field in the application.

7. The method of claim 6, wherein the at least one data field comprises a text field, an image field, a number field or a video field.

8. The method of claim 1, wherein the application is stored in a temporary storage device of the mobile device.

9. An apparatus for launching an application on a mobile device comprising:

a processing circuit configured to execute instructions on a mobile device;

a storage device in communication with the processing circuit; and a communication interface in communication with the processing circuit and configured to communicate with a remote computing device, wherein the processing circuit is configured to execute one or more instructions within the storage device to:

launch an application launcher on the mobile device;

establish, through the communication interface, a communicative link from the mobile device to the remote computing device;

transmit, through the communication interface, a request to the remote computing device to obtain data to create a user interface of an application associated with the application launcher;

receive, through the communication interface at the mobile device, the requested data from the remote computing device; and assemble the user interface of the application using the requested data, the application residing on the mobile device, and the requested data is sufficient to assemble the user interface, wherein the application residing on the mobile device continues operating on the mobile device when the communicative link to the remote computing device is disconnected and, upon reestablishment of the communicative link, data is synchronized between the application residing on the mobile device and the remote computing device.

10. The apparatus of claim 9, wherein the received data is received from the remote computing device in a first format type and is translated by the application launcher on the mobile device from the first format type into a second format type, and wherein the second format type is compatible with an operating system of the mobile device.

11. The apparatus of claim 10, wherein the remote computing device and the mobile device are communicatively linked.

12. The apparatus of claim 9, wherein a change in the application on the mobile device causes a change in the identical application on the remote computing device.

13. The apparatus of claim 9, wherein transmitting the request to the remote computing device further comprises causing the remote computing device to authenticate the mobile device.

14. The apparatus of claim 13, wherein authenticating the mobile device comprises:

receive authorization permission to access the application; and receive authorization permission to modify at least one data field in the application.

15. The apparatus of claim 9, wherein the application is stored in a volatile storage device of the mobile device.

16. The apparatus of claim 9, wherein the remote computing device comprises a server.

17. The apparatus of claim 9, wherein a format type on the remote computing device is a third format type.

* * * * *